E. M. KRAMER.
BAND CUTTER AND FEEDER.
APPLICATION FILED AUG. 6, 1906.
902,237.
Patented Oct. 27, 1908.
3 SHEETS—SHEET 1.
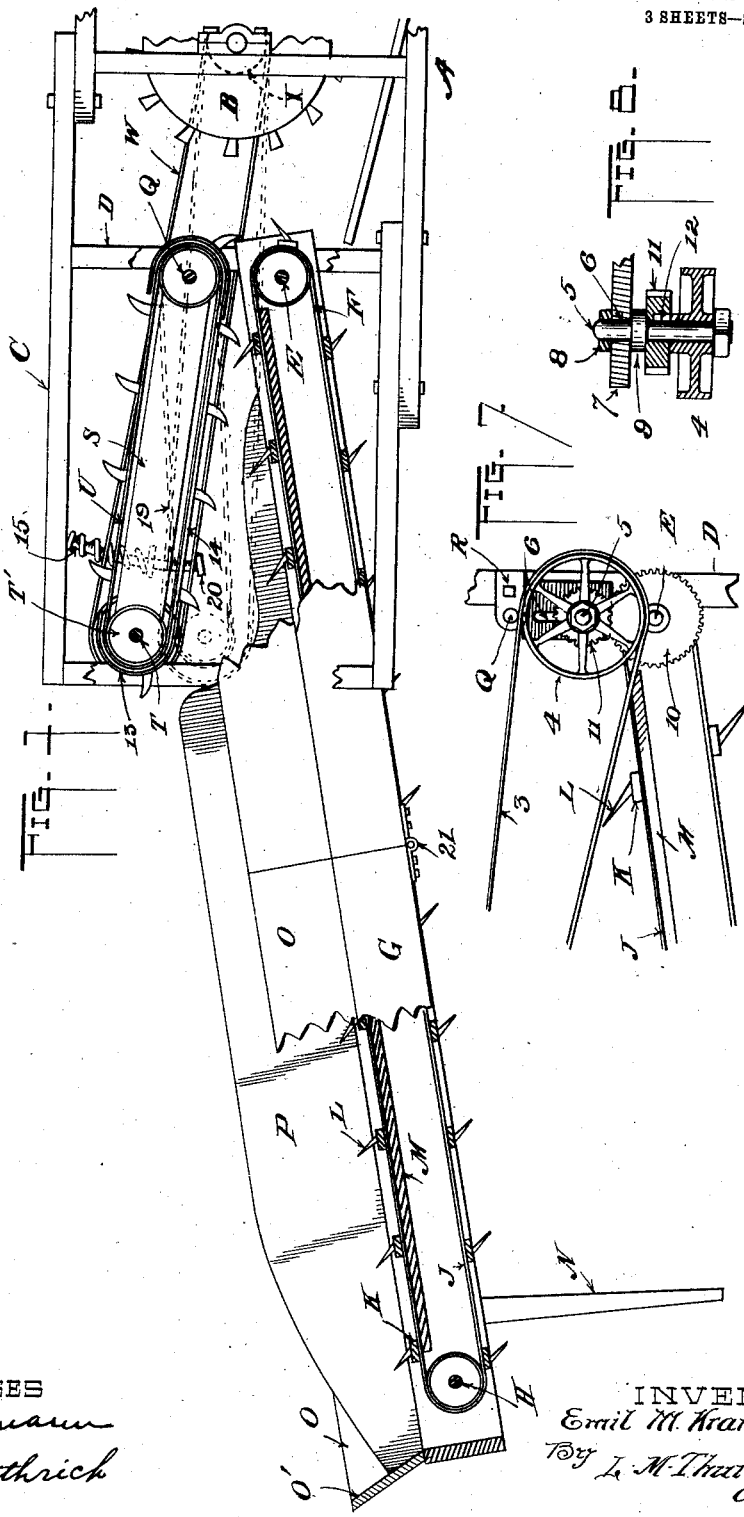
WITNESSES
INVENTOR
Emil M. Kramer,
By L. M. Thurlow
Atty.

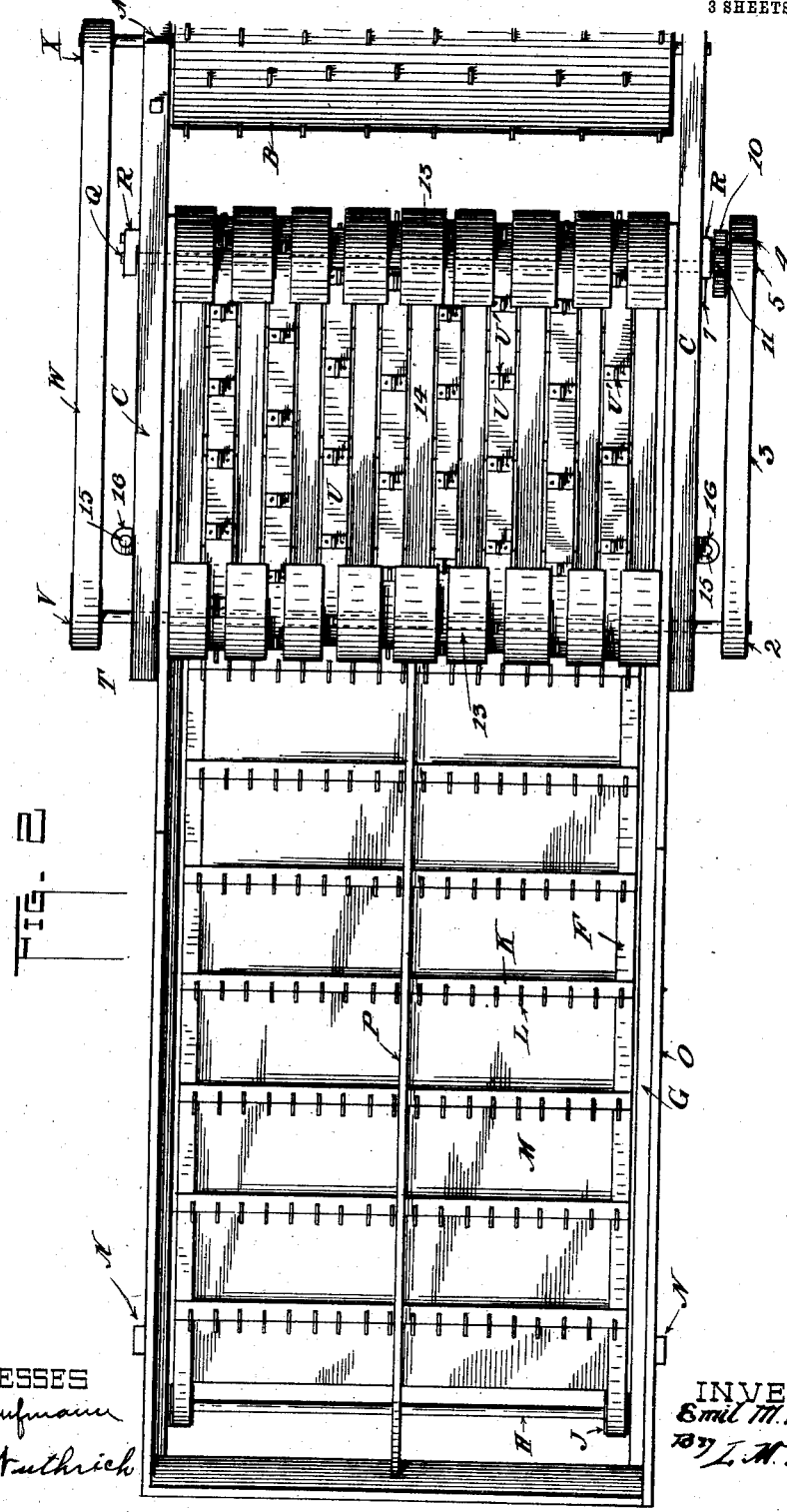

E. M. KRAMER.
BAND CUTTER AND FEEDER.
APPLICATION FILED AUG. 6, 1906.
902,237.
Patented Oct. 27, 1908.
3 SHEETS—SHEET 3.
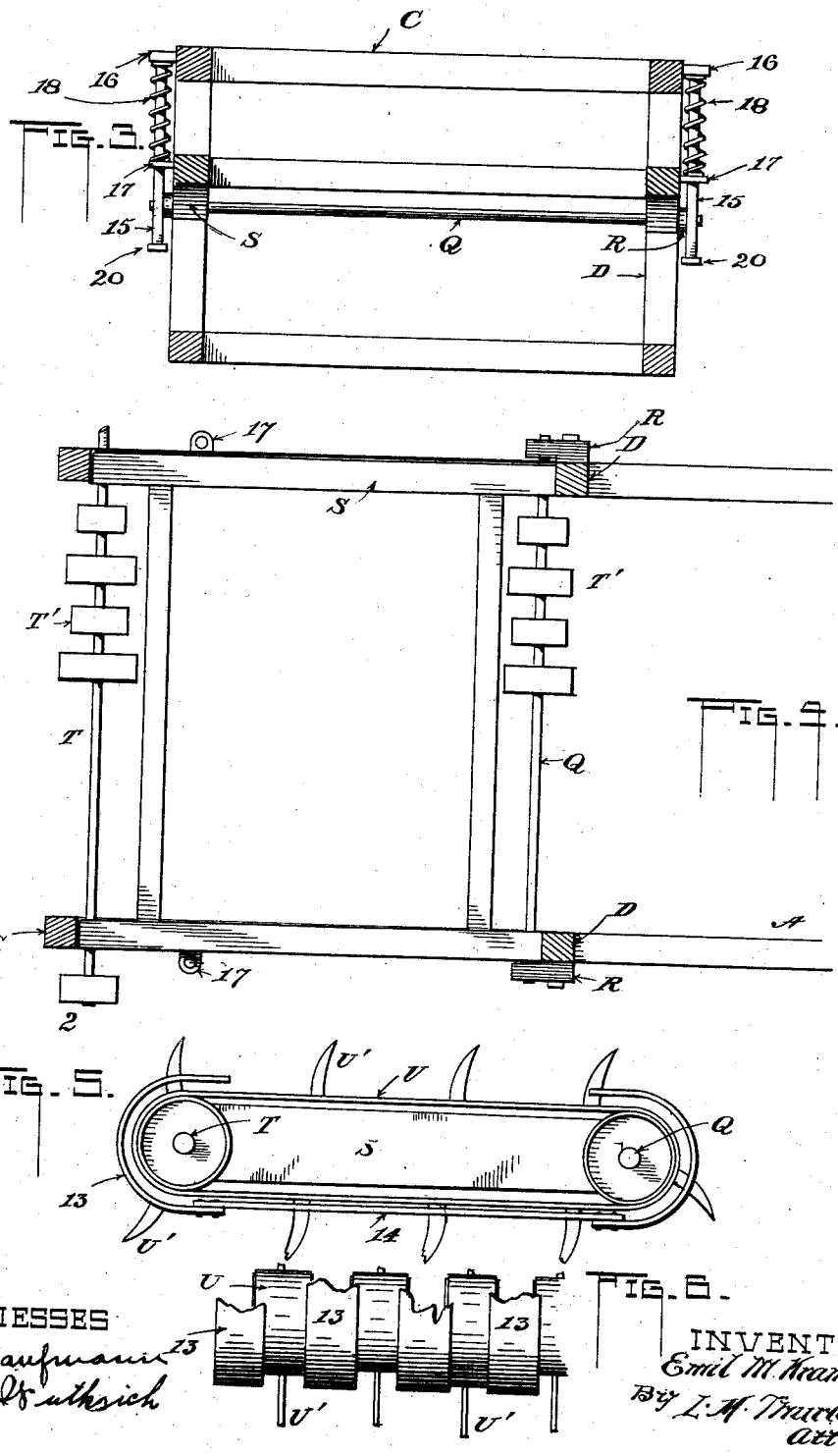

UNITED STATES PATENT OFFICE.

EMIL M. KRAMER, OF CISSNA PARK, ILLINOIS.

BAND-CUTTER AND FEEDER.

No. 902,237.　　　Specification of Letters Patent.　　　Patented Oct. 27, 1908.

Application filed August 6, 1906. Serial No. 329,489.

*To all whom it may concern:*

Be it known that I, EMIL M. KRAMER, citizen of the United States, residing at Cissna Park, in the county of Iroquois and State of Illinois, have invented certain new and useful Improvements in Band-Cutters and Feeders; and I do hereby declare that the following is a full, clear, and exact description of the invention, which will enable others skilled in the art to which it appertains to make and use the same.

This invention has reference to improvements in band cutter and feeder attachments for grain separators.

An object of the invention is to provide a band cutter and feeder having peculiarly arranged mechanism by which the straw from which the grain is threshed will be fed to the cylinder of the separator in a thin even layer.

A still further and important object is to produce a machine having a main feeding carrier for receiving the bundles of grain and a series of belts above it adapted to run at relatively different speeds, the slowest of the series running faster than the said main carrier thus resulting in causing an even distribution and separation of the straw into a thin layer before reaching the separator.

Another object lies in the provision of means for changing the relative speeds of the main carrier and the series of belts above it as will be hereinafter described.

The invention further relates to certain details of construction as will appear hereinafter and form part of the accompanying claims.

In bringing out my particular mechanism the aim has been to provide a feeder for separators that will thoroughly spread the straw into a thinner and more even layer. By the provision of a relatively slow moving carrier for receiving the bundles of grain and providing fingers therefor for combing the straw, and a series of belts above the carrier also having fingers or knives, said belts all moving at different rates of speed I am enabled, by driving the slowest belt of the series faster than the carrier, to comb the straw and separate its strands lengthwise so that upon reaching the cylinder of the separator it will be fed thereto in a thin even layer and very thoroughly beaten and all the grain removed therefrom. In many machines with which I am acquainted the straw is fed to the cylinder so unevenly that it is drawn through in bunches thus straining the separator and injuring it to say nothing of the loss of grain that cannot be recovered after passing through the cylinder. I am enabled, in addition to the above, to change the speed of the main carrier as compared with that of the knife carrying belts above it so that the straw can be introduced to the cylinder in a layer of a desired density or thickness as may be occasioned by the condition of the straw, it being obvious that when thoroughly ripe the grain can be more easily separated than when it is in an unripe condition, and also that the straw can be fed in a thicker layer and faster.

In the drawings presented herewith, Figure 1 is a side elevation of my improved band cutter and feeder in part section and in combination with part of a separator. Fig. 2 is a top view of the band cutter and feeder shown in connection with a separator. Fig. 3 is a transverse section of a portion of the frame of the device. Fig. 4 is a horizontal section of part of the main frame showing a pivoted frame for carrying a series of belts. Fig. 5 is a side view of a belt provided with knives for cutting the bands of the bundles of straw, and showing pulleys for carrying the same and a shield for protecting the pulleys and belt. Fig. 6 is a front view of the series of pulleys and their belts, and the shields for the same. Fig. 7 is a side view in detail of a part of the gearing of the machine for imparting opposite directions of movement to the straw separating mechanisms. Fig. 8 is a horizontal sectional view of a part of the same.

In the figures A represents that portion of the frame of the separator in which is mounted the usual cylinder B.

C indicates the frame of the band cutter and feeder suitably supported on the separator frame A. Upon the uprights D of the frame C is journaled a horizontal shaft E the bearings for which are not shown. Said shaft carries, and answers as a pivot for, a frame G whose outer end carries a shaft H as shown in Fig. 1. These said shafts are each provided with a pair of pulleys J which carry the belts F. Suitably carried by the belts are cross bars K provided with forwardly inclined fingers L; the belts and bars K traveling upon a supported board M. The outer end of the frame G is supported by suitable legs N and may be adjusted on the shaft E as a pivot for any desired inclination. Said frame G is provided with raised sides O and the end O', while a central dividing board P is located within the device, as shown, so that bundles of grain will be distributed upon the carrier at each side as in the customary manner. Also journaled on the upright D of the frame C is a shaft Q carried in bearings indicated at R in Figs. 2, 3, 4 and 7. Said shaft, as shown in Fig. 4, carries one end of a frame S, on the opposite end of which is a shaft T. Each shaft, Q and T, carries a series of pulleys T' of different sizes a number of which are indicated in Fig. 4, all of them, however, being in Fig. 2 though not seen. It is my design to vary the sizes of these pulleys, providing for each pair a belt U. Being of different sizes the belts will necessarily have different speeds. I do not confine myself to a stated number of the pulleys nor to having the pairs on the opposite shafts of the same size; it is necessary only that each belt shall travel at a speed entirely different from any of the others whereby the straw is retarded at one place in its travel and accelerated at another to separate the strands or wisps lengthwise. The shaft T is driven by means of a pulley V thereon receiving motion through a belt W from a pulley X on the shaft of the cylinder B of the separator as shown in Fig. 2. The opposite end of the said shaft T carries a pulley 2 which drives a belt 3 and pulley 4 on a stub shaft 5 shown in Figs. 7 and 8. This stub shaft is adjustable in a slot 6 of a plate 7 bolted to the upright D of the frame C as shown in Fig. 7, and is screw threaded on its inner end for receiving a nut 8 by which it may be secured in place by the aid of the integral collar 9 outside the plate 7. The shaft E of the carrier F is provided with a stationary gear-wheel 10 and with this is designed to mesh a pinion 11 removably carried on said stub shaft, the pulley 4 on the latter engaging said pinion by means of a projection 12 on the hub of said pulley as shown in Fig. 8 whereby movement of the said pulley will drive the pinion and consequently the gear wheel 10 on the said shaft E. The stub shaft 5 is adjustable in the slot 6 to permit of adjusting the pinion 11 carried thereon so that its teeth can be brought into mesh with those of the said gear 10. It will now be observed that the cylinder B being driven in the usual manner will impart motion to the series of belts through the belt W, and drive the pulley 4 just described, also the pinion 11, imparting a reverse direction of motion to the gear 10 of the shaft E whereby the upper stretch of the carrier F will travel toward the cylinder or in the same direction as the under stretches of the belts U. Each of the latter are provided with a series of knives U', which of necessity, travel at different speeds.

If now a bundle of grain is thrown upon the carrier F the cross bars K and their fingers L will carry it up to and beneath the belts U. As hereinbefore stated it is my purpose to drive the carrier FK at a given speed the belts U traveling at a faster speed so that their knives will cut the bands of the bundles, and in traveling at a faster speed will draw part of the straw along faster than the movement of the carrier. The result is that the straw will be thoroughly combed and separated lengthwise and gradually fed in a thin even layer to the cylinder. The rearwardly projecting fingers L of the carrier in moving slowly will necessarily set up a resistance to the drag of the faster moving fingers U' so that the combing operation and separation must be the result. As the bundles are thrown upon the carrier each in its turn will be thoroughly spread before reaching the cylinder of the separator and there can be no loss of grain in consequence of the straw passing through in uneven bunches as often results in the older style of machines. Each portion of the straw in my device is exposed to the beating action of the cylinder with a consequent saving of grain due to its uniform introduction to the cylinder. I provide for the belts U, the pulleys T' protected by the shields shown at 13 the same being connected at their lower ends by slots 14 but one of which is shown in Figs. 1 and 5. These shields which are mounted in any suitable manner in a stationary position prevent the straw entering between the belts and the pulleys and wrapping around the shafts. They also serve to hold the straw down upon the carrier and in position where the knives U' can readily accomplish their work. As a matter of preference I provide for a yielding downward pressure of the frame S upon the straw by means of a rod 15 at each side of the frame S as shown in Fig. 3, the upper ends of which are secured to the top members of the frame C by projecting lugs 16 as shown in said figure. Said rods are bent in the arc of a circle the center of which is described from the shaft Q. At each side of the frame S is a lug 17 through which the rods pass and between each said lug and the projection 16 above it is introduced a spiral spring 18. The dotted lines 19 in Fig. 1 denote the lowered position of the frame S caused by the depressing action of the springs thereon which results when there are no bundles of straw beneath. A member 20 on the lower end of each rod 15 limits the downward movement of the frame, the position of the frame being such as to admit the end of a bundle of straw therebeneath. As the bundle enters further between the carrier and the belts U the frame S is raised against the tension of the springs. Said springs being thus compressed keep a yielding pressure upon the bundles as they are combed apart by the action hereinbefore described. Obviously, the frame S and its parts being of considerable weight a downward pressure would result by such weight and would answer the same as the springs which could be eliminated. The dividing board P is cut out at its rearward end to permit the vertical movement of the rear end of the frame S as shown in Fig. 1 so that there will be no interference whatever. If it is desired to change the speed of the carrier with relation to that of the belts U it is only necessary to remove the pulley 4 from the stub shaft 5 this action withdrawing the projection 12 from the engagement with the pinion 11. Said pinion is removed from the stub shaft and replaced by another of larger or smaller size as occasion demands after which the pulley 4 is replaced with its said projection 12 in engagement with the new pinion, there being provision for the reception of such projection as will be understood. The stub shaft 5 is then adjusted in the slot 6 so that the proper engagement of the teeth of the new pinion with the gear 10 will result. It is seen that by this arrangement it is quite easy to change the speeds for the purposes hereinbefore described and also for the following reasons:—It may be found that a certain lot of grain is damp and not easy to separate and in consequence it may be desired to enter it in a slower manner and in a thinner layer than would be needed for dry grain and in consequence a reduction of speed of the carrier would be advisable to retard the straw so that the faster moving knives U' will comb the straw out thinner and feed it in a thinner layer to the cylinder; also if grain is badly tangled the same process may be required for its proper treatment.

It will be noted that as the frame S is movable vertically at its free end the belt W must rise and fall with the pulley V of the shaft T but as the pulley travels in the arc of a circle, taking the shaft Q as a center, the distance between the shaft T and the shaft of the cylinder will vary so slightly that the said belt will remain at nearly the same tension always. For convenience in transportation I construct the frame G in two portions and provide a hinge at 21 at the place of separation as shown in Fig. 1 whereby the said frame may be folded into a compact form, the division board P being removable to allow the folding operation, the supporting table M having provision for folding also but this has not been shown. The knives U' of the belts U may be of any desired form and may also be mounted in any suitable manner on the belts to produce the desired results, this being true also of the fingers L of the bars K of the carrier.

As distinguished from the existing art my mechanism includes a positive downward pressure of the frame S which carries the band cutting knives U' through springs which resist the rising tendency of the frame due to heavy feeding of grain thereunder. It also includes means for changing the speed of travel of the carrier or conveyer F relative to the band cutting devices found to be advantageous in handling dry or wet grains or those that are unripe or fully ripe as has been explained, said change being done in a positive manner and not depending upon friction in so doing.

It is not my purpose to confine myself to the exact construction shown and described since I may use similar mechanism and parts to that shown that will still come within the scope of the invention.

Having thus described my invention, I claim—

1. In a band cutter and feeder, a conveyer for receiving and carrying grain to the threshing cylinder, a series of belts above said conveyer, a frame for carrying said belts, means for imparting relatively different speeds to the belts, a series of band cutting knives on the belts and consequently moving at different speeds, the said frame and the delivery end of the conveyer being relatively fixed in position, the forward end of the said means adapted for free vertical movement, and means for providing a yielding downward pressure upon the frame upon the grain substantially as and for the purposes set forth.

2. In a band cutter and feeder, a conveyer for delivering grain to the threshing cylinder, a series of belts above said conveyer, a frame for carrying the same, means for driving the conveyer and imparting relatively different speeds to the belts, but all of which are adapted to move faster than the conveyer, a series of band cutting knives on the belts and consequently moving at different speeds, the said belt frame and the delivery end of the conveyer being relatively fixed in position the outer end of the said frame adapted for vertical movement and means for imparting positive downward movement to the belt carrying frame for the purposes set forth.

3. In a band cutter and feeder, a traveling conveyer for delivering grain to the threshing cylinder, a series of belts above the conveyer adapted to be driven at relatively different speeds, band cutting devices carried thereby, said belts having fixed relation at one end with the delivery end of the conveyer, their other ends adapted for a vertical tilting motion, means for imparting to the belts a positive downward pressure upon the grain, means for imparting movement to the belts, and mechanism for altering the speed of travel of the belts relative to the conveyer, said mechanism comprising a gear for driving the conveyer, an adjustable stud adjacent thereto, a pinion on the stud adapted to drive the gear, and a driving wheel to impart movement to the pinion and driven from the said belts.

4. In a band cutter and feeder, a conveyer arranged to travel toward and deliver grain to the threshing cylinder and having teeth thereon, a series of variously speeded band cutting devices, coöperating with the teeth of the conveyer for the delivery of the grain to the cylinder in a thin, even layer, the delivery end of the conveyer and one extremity of the said series of band cutters having relatively fixed position, the opposite end of the band cutters adapted for vertical movement, and means in conjunction with and for imparting a positive downward pressure of the said band cutter upon the grain and mechanism for driving the conveyer and band cutter.

5. In a band cutter and feeder, a conveyer arranged to travel toward and deliver grain to the threshing cylinder and having teeth thereon, a series of variously speeded band cutting devices, coöperating with the teeth of the conveyer for the delivery of the grain to the cylinder in a thin even layer, the delivery end of the conveyer and one extremity of the said series of band cutters having relatively fixed position, the opposite end of the band cutters adapted for vertical movement, and means in conjunction with and for imparting a positive downward pressure of the said band cutter upon the grain and mechanism for driving the conveyer and band cutter, the latter arranged to have a greater speed of travel than said conveyer.

6. In a band cutter and feeder, a conveyer arranged to travel toward and deliver grain to the threshing cylinder and having teeth thereon, a series of variously speeded band cutting devices, coöperating with the teeth of the conveyer for the delivery of the grain to the cylinder in a thin even layer, the delivery end of the conveyer and one extremity of the said series of band cutters having relatively fixed position, the opposite end of the band cutters adapted for vertical movement, means in conjunction with and for imparting a positive downward pressure of the said band cutter upon the grain and mechanism for driving the conveyer and band cutter, the latter arranged to have a greater speed of travel than said conveyer and means for varying the relative speeds of the conveyer and the series of band cutters.

In testimony whereof I affix my signature, in presence of two witnesses.

EMIL M. KRAMER.

Witnesses:
J. W. KAUFMANN,
SAM. A. BROWN.